(12) United States Patent
Lin et al.

(10) Patent No.: US 10,199,662 B2
(45) Date of Patent: Feb. 5, 2019

(54) BIPOLAR PLATE, FUEL CELL, AND FUEL CELL STACK

(71) Applicant: Industrial Technology Research Institute, Hsinchu (TW)

(72) Inventors: Chih-Chia Lin, Taichung (TW); Cheng-Hong Liu, Chiayi (TW); Ching-Ying Huang, Tainan (TW); Wen-Lin Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 66 days.

(21) Appl. No.: 15/445,993

(22) Filed: Mar. 1, 2017

(65) Prior Publication Data

US 2018/0166704 A1 Jun. 14, 2018

(30) Foreign Application Priority Data

Dec. 14, 2016 (TW) .............................. 105141373 A

(51) Int. Cl.
| | |
|---|---|
| *H01M 8/02* | (2016.01) |
| *H01M 8/24* | (2016.01) |
| *H01M 8/0258* | (2016.01) |
| *H01M 8/241* | (2016.01) |
| *H01M 8/0267* | (2016.01) |
| *H01M 8/026* | (2016.01) |

(52) U.S. Cl.
CPC ......... *H01M 8/0258* (2013.01); *H01M 8/026* (2013.01); *H01M 8/0267* (2013.01); *H01M 8/241* (2013.01)

(58) Field of Classification Search
None
See application file for complete search history.

(56) References Cited

U.S. PATENT DOCUMENTS

| | | | |
|---|---|---|---|
| 6,261,710 | B1 | 7/2001 | Marianowski |
| 7,459,227 | B2 | 12/2008 | Rock et al. |
| 8,263,289 | B2 | 9/2012 | Miyazawa et al. |
| 8,304,139 | B2 | 11/2012 | Hood et al. |
| 8,518,603 | B2 | 8/2013 | Jang |
| 8,882,859 | B2 | 11/2014 | Bae |
| 2004/0086769 | A1 | 5/2004 | Diez |
| 2005/0252892 | A1* | 11/2005 | Newman ............ H01M 8/0206 219/121.64 |

(Continued)

FOREIGN PATENT DOCUMENTS

| | | |
|---|---|---|
| CN | 101312247 | 11/2008 |
| TW | 200812140 | 3/2008 |

(Continued)

OTHER PUBLICATIONS

"Office Action of Taiwan Counterpart Application," dated Sep. 21, 2017, p. 1-p. 4.

(Continued)

*Primary Examiner* — Scott J. Chimielecki
(74) *Attorney, Agent, or Firm* — JCIPRNET

(57) ABSTRACT

A bipolar plate, a fuel cell, and a fuel cell stack are provided. The bipolar plate includes a first flow-field plate and a second flow-field plate. The first flow-field plate and the second flow-field plate are stacked, and the edges of the first and second flow-field plates have a continuous welding portion to seal the periphery of the bipolar plate by a welding method.

12 Claims, 6 Drawing Sheets

(56) References Cited

U.S. PATENT DOCUMENTS

| | | | |
|---|---|---|---|
| 2009/0023026 A1 | 1/2009 | Chin et al. | |
| 2011/0262826 A1* | 10/2011 | Dadheech | C25D 1/04 |
| | | | 429/457 |
| 2011/0262831 A1* | 10/2011 | Dadheech | H01M 8/0208 |
| | | | 429/479 |
| 2012/0107713 A1* | 5/2012 | Miller | H01M 8/0247 |
| | | | 429/457 |
| 2012/0129073 A1* | 5/2012 | Spencer | H01M 8/0247 |
| | | | 429/460 |
| 2012/0308910 A1* | 12/2012 | Morris | H01M 8/2483 |
| | | | 429/457 |

FOREIGN PATENT DOCUMENTS

| | | |
|---|---|---|
| TW | I411155 | 10/2013 |
| TW | 201628243 | 8/2016 |

OTHER PUBLICATIONS

Y.-F. Tzeng, "Process Characterisation of Pulsed Nd:YAG Laser Seam Welding," The International Journal of Advanced Manufacturing Technology, vol. 16, Issue 1, Jan. 1, 2000, pp. 10-18.

M.P. Brady, et al., "Manufacturing and performance assessment of stamped, laser welded, and nitrided FeCrV stainless steel bipolar plates for proton exchange membrane fuel cells," International Journal of Hydrogen Energy, vol. 38, Issue 11, Apr. 15, 2013, pp. 4734-4739.

D. J. Radakovic, et al., "Predicting Resistance Spot Weld Failure Modes in Shear Tension Tests of Advanced High-Strength Automotive Steels," Welding Research, vol. 87, Apr. 2008, pp. 96-s-105-s.

Yasunobu Miyazaki, et al, "Tensile Shear Strength of Laser Welded Lap Joints," Nippon Steel Technical Report, No. 95, Jan. 2007, pp. 28-34.

\* cited by examiner

BIPOLAR PLATE, FUEL CELL, AND FUEL CELL STACK

CROSS-REFERENCE TO RELATED APPLICATION

This application claims the priority benefit of Taiwan application serial no. 105141373, filed on Dec. 14, 2016. The entirety of the above-mentioned patent application is hereby incorporated by reference herein and made a part of this specification.

TECHNICAL FIELD

The disclosure relates to a bipolar plate, a fuel cell, and a fuel cell stack.

BACKGROUND

The membrane electrode assembly (MEA) mainly has two catalyst layers (i.e. anode and cathode) isolated by a solid polymer electrolyte membrane (i.e. proton exchange membrane) and gas diffusion layers respectively attached to the outsides of the two catalyst layers. A bipolar plate having a fluid channel is on the outside of the gas diffusion layer. When continuously replenishing hydrogen to the anode and continuously replenishing oxygen or air to the cathode, an oxidation-reduction reaction may occur on the electrodes, wherein the protons arrive at the cathode via the electrolyte and the electrons arrive at the cathode from the anode via an external load so as to complete the current loop. The reaction product (water) and unreacted hydrogen and oxygen or air are discharged from the gas channel outlet.

During the assembly of the fuel cell, each element (such as the end plates, collector plates, monopolar plates, and bipolar plates) is sequentially stacked. To ensure the reaction gas introduced in the battery can smoothly flow inside the battery without leaking, many sealing members (e.g. gas sealing members and cooling flow field sealing members) are added between each of the elements, and the object of sealing is achieved by the specific placements of the sealing members and the lamination between the elements. However, as the power of the battery is increased, since the quantity of the elements is increased, assembly error inevitably occurs, and the error affects the effectiveness of the sealing members and may even cause sealing failure.

SUMMARY

A bipolar plate of a fuel cell of the disclosure includes a first flow-field plate and a second flow-field plate. The first flow-field plate and the second flow-field plate are stacked, and the edges of the first and second flow-field plates have a continuous welding portion to seal the periphery of the bipolar plate by a welding method.

A fuel cell of the disclosure includes a membrane electrode assembly (MEA), a pair of bipolar plates described above, and a plurality of gas sealing members. The MEA is disposed between the two bipolar plates, and the gas sealing members are respectively disposed between the MEA and each of the bipolar plates.

A fuel cell stack of the disclosure includes a plurality of the above fuel cells stacked upon one another.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
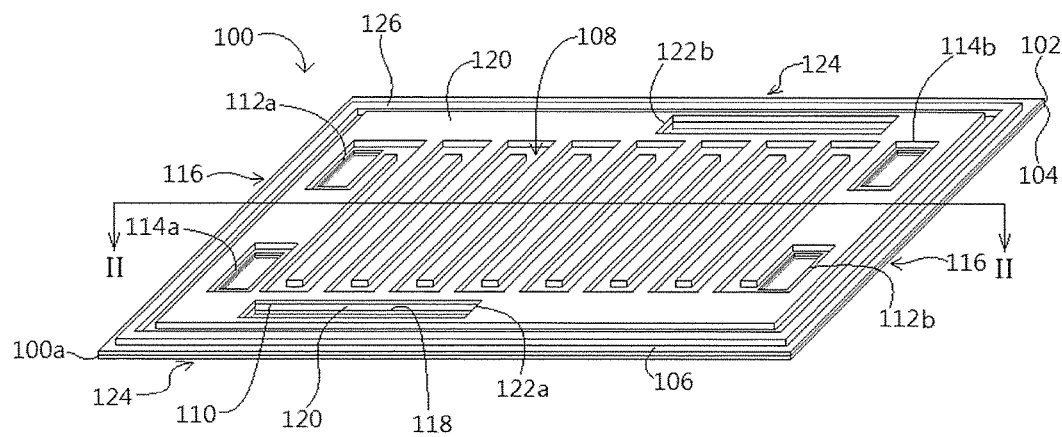
FIG. 1A is a three-dimensional schematic diagram of a bipolar plate of a fuel cell according to the first embodiment of the disclosure.

Hereinafter, the embodiments of the disclosure are more comprehensively described with reference to figures. However, the disclosure can still be implemented in many different forms, and therefore the figures and the following embodiments are only provided to make the concepts of the disclosure clearer and more complete and are not intended to limit the scope of the disclosure. In the figures, for clarity, the relative thickness and location of film layers, regions, and/or structural elements may be reduced or enlarged. Similar or same reference numerals in each of the figures tend to indicate the presence of similar or same elements or characteristics. Similar reference numerals in the figures represent similar elements and descriptions thereof may be omitted.

Figure 1B:
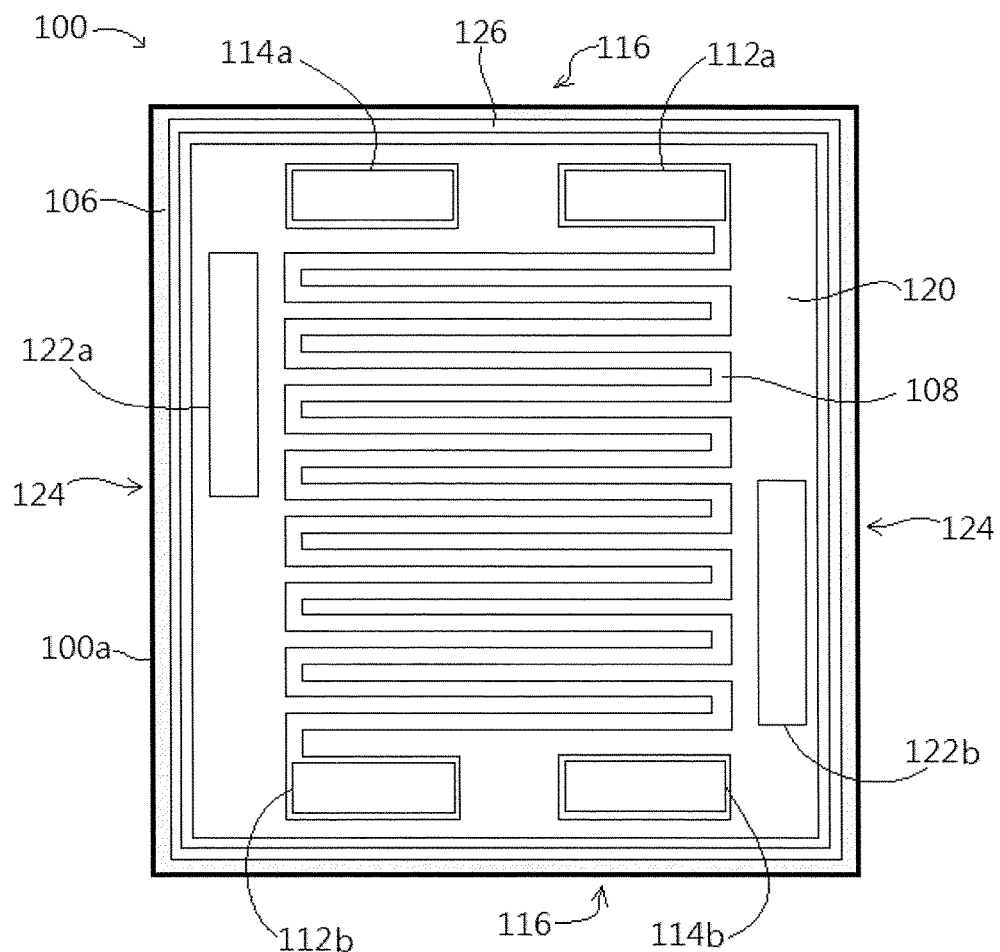
FIG. 1B is a planar schematic diagram of the bipolar plate of FIG. 1A.

FIG. 1A is a three-dimensional schematic diagram of a bipolar plate of a fuel cell according to the first embodiment of the disclosure. FIG. 1B is a planar schematic diagram of the bipolar plate of FIG. 1A.

Please refer to both FIG. 1A and FIG. 1B. A bipolar plate 100 of the first embodiment includes a first flow-field plate 102 and a second flow-field plate 104, and the first flow-field plate 102 and the second flow-field plate 104 are stacked. The edges of the first and second flow-field plates 102 and 104 have a continuous welding portion 106 to seal a periphery 100a of the bipolar plate by a welding method, wherein the welding method is, for instance, plasma arc welding or laser welding, but the disclosure is not limited thereto. Moreover, the first and second flow-field plates 102 and 104 are, for instance, metal materials, and therefore sealing can be completed via the above welding method, and an additional cooling flow field sealing member is not needed. The first flow-field plate 102 generally has a first gas channel 108 and a first cooling channel 110. The first gas channel 108 is a serpentine channel as shown in FIG. 1A, but the disclosure is not limited thereto, and the first gas channel 108 can also be a column channel or an interdigitated channel.

In FIG. 1A and FIG. 1B, the bipolar plate 100 can be further provided with a first gas inlet hole 112*a*, a second gas inlet hole 114*a*, a first gas discharge hole 112*b*, and a second gas discharge hole 114*b*. The first and second gas inlet holes 112*a* and 114*a* and the first and second gas discharge holes 112*b* and 114*b* are respectively disposed at first opposite sides 116 of the bipolar plate 100. Therefore, the fuel (such as hydrogen) or oxidizing agent (such as oxygen or air) entering the fuel cell can enter the first gas channel 108 via the first gas inlet hole 112*a* and be discharged from the first gas discharge hole 112*b*. Similarly, another gas can enter the second gas channel (not shown) of the second flow-field plate 104 via the second gas inlet hole 114*a* and be discharged from the second gas discharge hole 114*b*.

In the first embodiment, the first gas channel 108 and the first cooling channel 110 are, for instance, concave-convex grooves with complementary shapes, and therefore regions in FIG. 1A not recessed in the manner of the first gas channel 108 can all be regarded as the first cooling channel 110. Moreover, if the second flow-field plate 104 has a second cooling channel 118 and a second gas channel corresponding to the location of the first flow-field plate 102, the first and second cooling channels 110 and 118 can be constituted to a cooling flow field 120 after stacking the first and second flow-field plates 102 and 104. The bipolar plate 100 can further be provided with a cooling liquid inlet hole 122*a* and a cooling liquid discharge hole 122*b* respectively disposed at second opposite sides 124 of the bipolar plate 100 and connected to the first cooling channel 110 and the second cooling channel 118. Therefore, after a cooling fluid (such as deionized water) enters a fuel cell, the cooling fluid can flow into the cooling flow field 120 formed by the first and second cooling channels 110 and 118 via the cooling liquid inlet hole 122*a* and be discharged from the cooling liquid discharge hole 122*b*. Therefore, the cooling fluid can be contained in the cooling flow field 120. In addition, the cooling liquid inlet hole 122*a* and the cooling liquid discharge hole 122*b* can also be respectively disposed at the first opposite sides 116 of the bipolar plate 100 and disposed at the same opposite sides as the first and second gas inlet holes 112*a* and 114*a* and the first and second gas discharge holes 112*b* and 114*b*.

The bipolar plate 100 can further have a continuous sealing channel 126 located between the cooling flow field 120 and the continuous welding portion 106. No liquid or gas enters or leaves the continuous sealing channel 126, and the continuous sealing channel 126 is completely sealed throughout, and the location thereof and the continuous welding portion 106 facilitate the bonding of the subsequent bipolar plate 100 with other elements.

The design of the first and second flow-field plates 102 and 104 in the first embodiment is not limited to the figures, and any channel design applicable to the bipolar plate can be used for the bipolar plate of the disclosure.

Figure 2A:
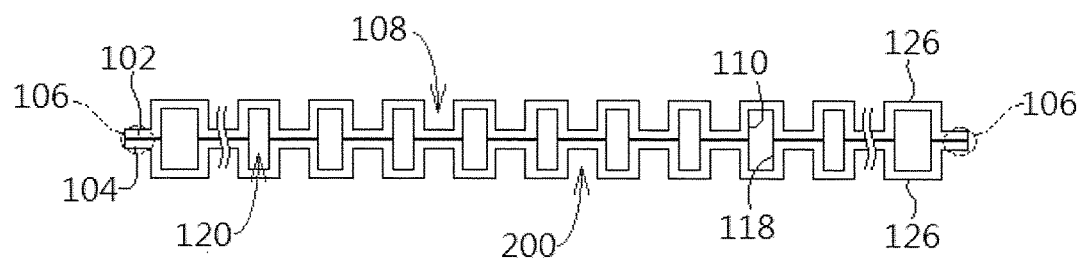
FIG. 2A is a cross-sectional schematic diagram of a bipolar plate of line segment II-II of FIG. 1A.

FIG. 2A is a cross-sectional schematic diagram of a bipolar plate of line segment II-II of FIG. 1A. It can be known from FIG. 2A that, the first gas channel 108 and the first cooling channel 110 are concave-convex grooves with complementary shapes. Moreover, the second flow-field plate 104 and the first flow-field plate 102 also have a second gas channel 200 and the second cooling channel 118. Therefore, the second gas channel 200 and the second cooling channel 118 can also be concave-convex grooves with complementary shapes. The second gas channel 200 is, for instance, a column channel, a serpentine channel, or an interdigitated channel. In FIG. 2A, it can be more clearly observed that the cooling flow field 120 is constituted by disposing the first cooling channel 110 of the first flow-field plate 102 opposite to the second cooling channel 118 of the second flow-field plate 104. Moreover, when viewed from the thickness direction of the bipolar plate, the height of the continuous sealed channel 126 is, for instance, the same as the height of the cooling flow field 120, and therefore the sealing between the elements is better.

Figure 2B:
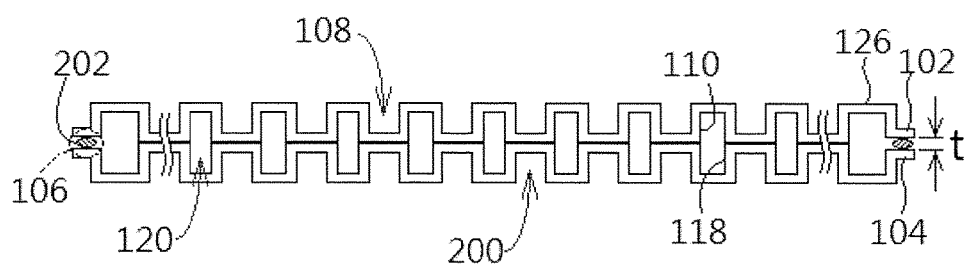
FIG. 2B is a cross-sectional schematic diagram of another bipolar plate of line segment II-II of FIG. 1A.

FIG. 2B is a cross-sectional schematic diagram of another bipolar plate of line segment II-II of FIG. 1A, wherein the same reference numerals as FIG. 2A are used to represent the same or similar regions or portions. In FIG. 2B, the continuous welding portion 106 can have a continuous welding ring (such as a continuous structure formed by solder) 202 disposed between the first flow-field plate 102 and the second flow-field plate 104, and the continuous welding portion 106 can be joined by melting the continuous welding ring 202. Moreover, since the continuous welding ring 202 has a certain thickness t, the edge portions of the first and second flow-field plates 102 and 104 need to be suitably modified in correspondence to the thickness t of the continuous welding ring 202. For instance, a space having the same size as the thickness t is provided at the edge portions of the first and second flow-field plates 102 and 104, such that the continuous welding ring 202 can be disposed between the two without affecting the designs of the first gas channel 108, the second gas channel 200, and the cooling flow field 120 in the continuous sealed channel 126.

Figure 2C:
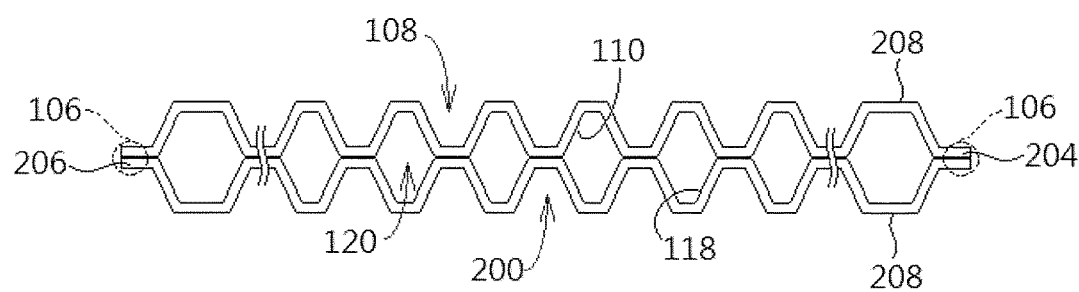
FIG. 2C is a cross-sectional schematic diagram of yet another bipolar plate of line segment II-II of FIG. 1A.

FIG. 2C is a cross-sectional schematic diagram of yet another bipolar plate of line segment II-II of FIG. 1A, wherein the same reference numerals as FIG. 2A are used to represent the same or similar regions or portions. In FIG. 2C, the first and second flow-field plates 204 and 206 are, for instance, sheet metals made by a stamping method, and therefore the first gas channel 108, the first cooling channel 110, the second cooling channel 118, and the second gas channel 200 are non-rectangular cross-sections, and the design of the remaining portions is the same as FIG. 2A and is not repeated herein.

Figure 3:
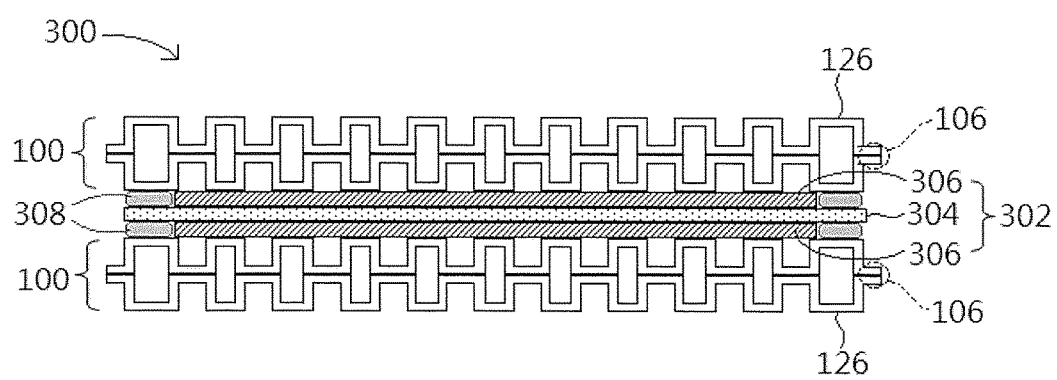
FIG. 3 is a cross-sectional schematic diagram of a fuel cell according to the second embodiment of the disclosure.

FIG. 3 is a cross-sectional schematic diagram of a fuel cell according to the second embodiment of the disclosure. Referring to FIG. 3, a fuel cell 300 of the second embodiment includes a membrane electrode assembly (MEA) 302, a pair of the bipolar plates 100, and a plurality of gas sealing members 308. The bipolar plates 100 can adopt the bipolar plate of the first embodiment. The MEA 302 is disposed between the two bipolar plates 100, and the space between the MEA 302 and the bipolar plates 100 is sealed by the gas sealing members 308. In the present embodiment, the MEA 302 includes a proton exchange membrane (PEM) 304 and a gas diffusion layer 306. The gas sealing member 308 can be in direct contact with the continuous sealing channel 126 of the bipolar plates 100 and the PEM 304 of the MEA 302 to completely seal the first gas channel 108 and the second gas channel 200 in the continuous sealing channel 126. Moreover, it should be known that the gas sealing members 308 can be extended to, for instance, the periphery of the first and second gas inlet holes (112*a* and 114*a*) and the first and second gas discharge holes (112*b* and 114*b*) of FIG. 1B to respectively seal the flow paths of different gases.

Figure 4:
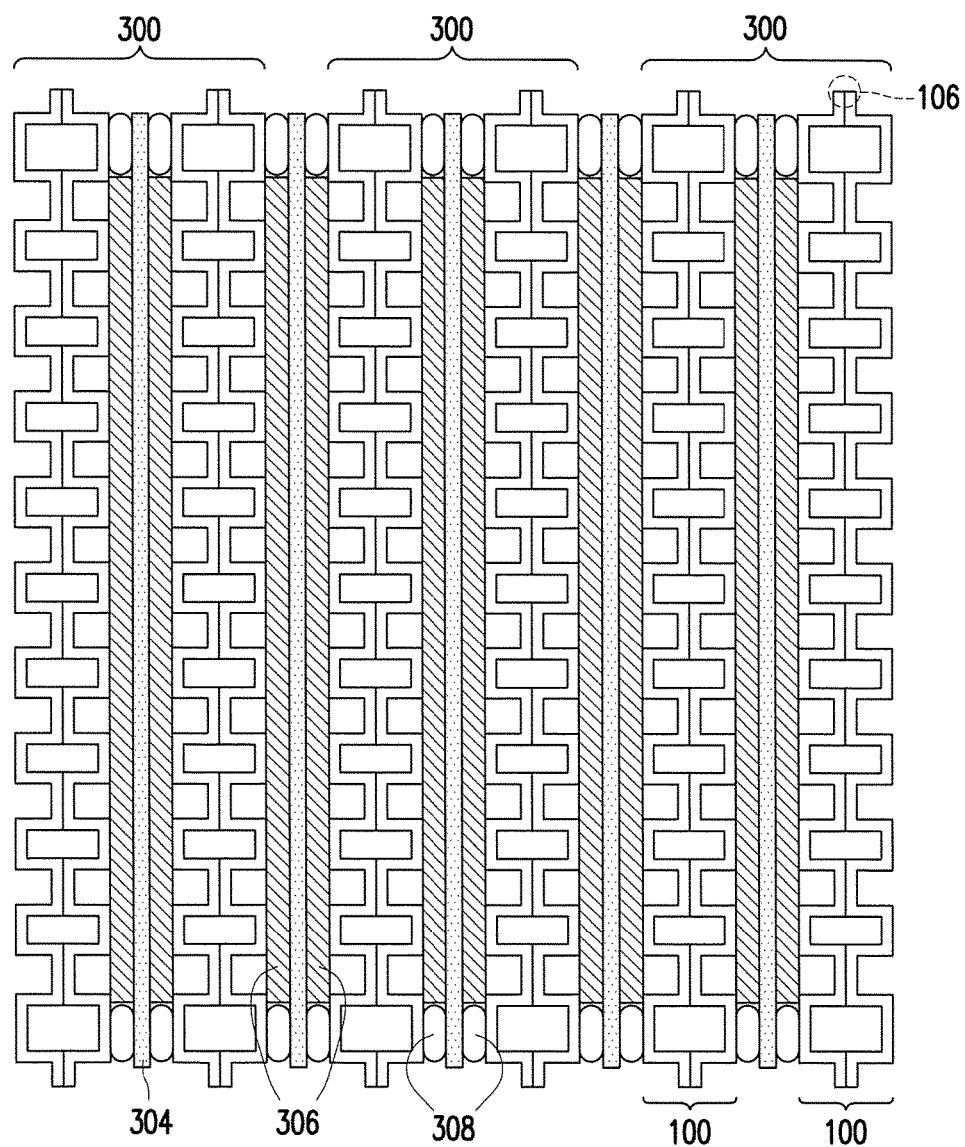
FIG. 4 is a cross-sectional schematic diagram of a fuel cell stack according to the third embodiment of the disclosure.

FIG. 4 is a cross-sectional schematic diagram of a fuel cell stack according to the third embodiment of the disclosure. In FIG. 4, the fuel cell stack includes above fuel cells 300 stacked upon one another. Moreover, a structure such as a monopolar plate, collector plate, or end plate can be further disposed on the outside of the fuel cell stack of the third embodiment, but the disclosure is not limited thereto.

A plurality of experimental examples is provided below to confirm the efficacy of the disclosure, but the scope of the disclosure is not limited to the following content.

EXPERIMENTAL EXAMPLE 1

Figure 5:
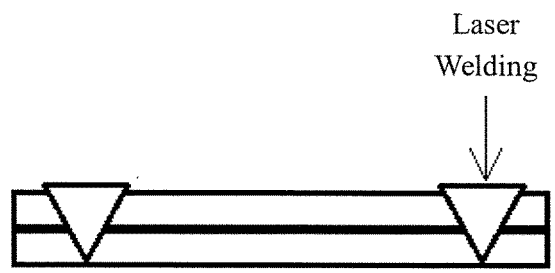
FIG. 5 is a schematic diagram of laser welding performed on a sheet metal of experimental example 1.

First, laser welding is performed on a 5×5 cm² sheet metal, and different compressive stresses were applied to the sheet metal via a universal testing machine to observe the effect thereof. The experimental schematic thereof is as shown in FIG. 5, and the relationship between compressive stress and interfacial contact resistance is shown in FIG. 6.

Figure 6:
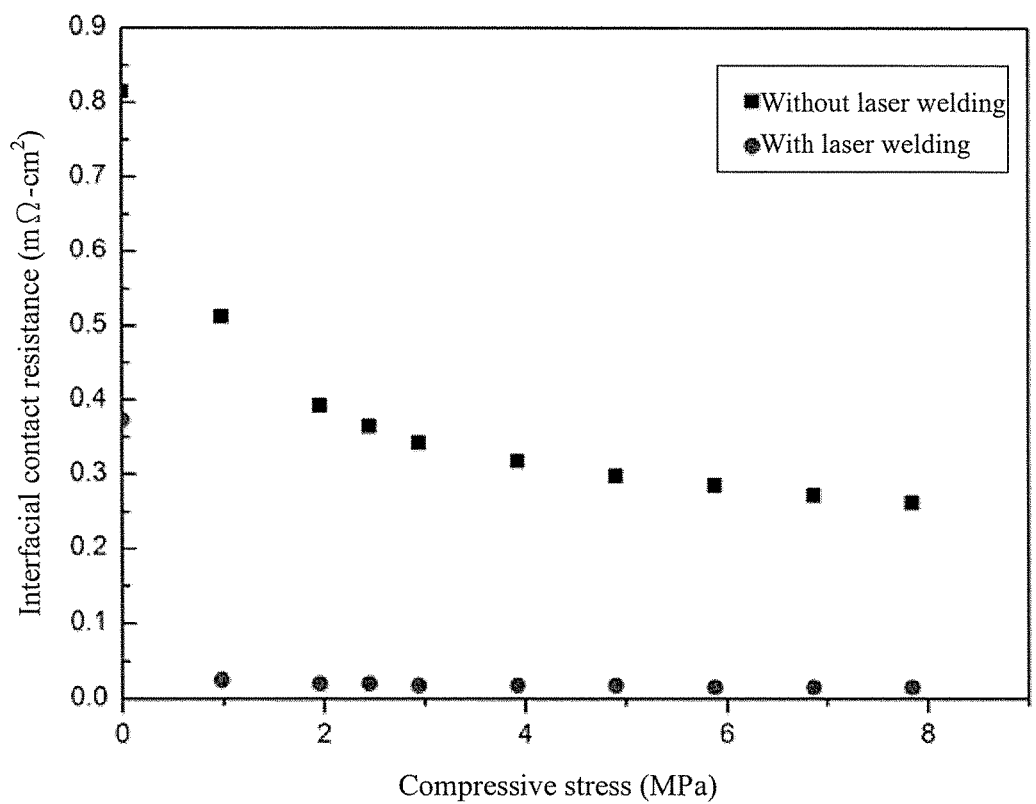
FIG. 6 is the relationship between interfacial contact resistance and compressive stress of sheet metals with and without laser welding.

Moreover, the same test was performed on a sheet metal without laser welding via a universal testing machine, and the results are also shown in FIG. 6.

It can be learned from FIG. 6 that, the interfacial contact resistance of the sheet metal with laser welding is significantly reduced, and the value thereof under different assembly stress is very stable, and compared to a sheet metal without laser welding, 95% of the interfacial contact resistance of the sheet metal can be effectively reduced from 0.36 mΩ-cm² to 0.02 mΩ-cm². Therefore, the electron transfer efficiency inside a battery pack can be significantly increased, and the overall performance of the battery can be strengthened.

EXPERIMENTAL EXAMPLE 2

First, a fuel cell stack was assembled by forty MEAs (such as 302 of FIG. 3) and thirty-nine of the bipolar plate (such as 100 of FIG. 3) of the disclosure. Moreover, a fuel cell stack was assembled by forty MEAs (such as 302 of FIG. 3) and eighty flow-field plates as the comparative example.

Figure 7:
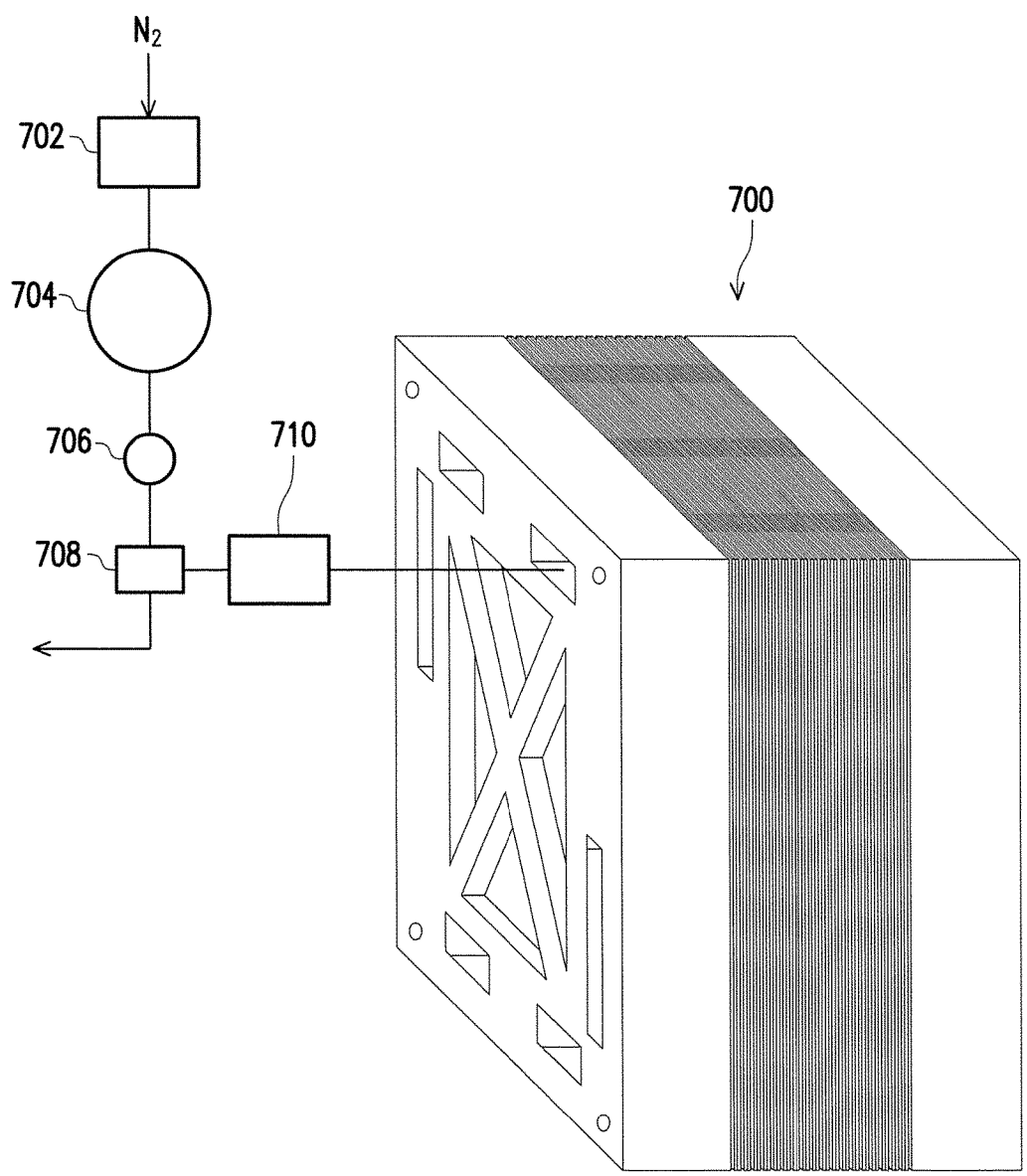
FIG. 7 is a test schematic diagram of experimental example 2.

Measurement of leakage rate was performed on two fuel cell stacks 700, and the measuring device thereof is as shown in FIG. 7, including a valve 702, a pressure gauge 704, a pressure regulating valve 706, a three-way valve 708, and a flowmeter 710. First, the sealing effect of the first gas channel region (such as 108 of FIG. 1A) was tested, and nitrogen gas was introduced into the first gas inlet hole (such as 112a of FIG. 1A) in the fuel cell stack 700 via the flowmeter 710, and the first gas discharge hole (such as 112b of FIG. 1A) was sealed. The gas pressure was slowly increased to the set pressure value, and the numeric value of the flowmeter 710 was read after the gas pressure was held for five minutes. The second gas channel region (such as 200 of FIG. 2A) and the cooling flow field (such as 120 of FIG. 2A) were measured in order. The resulting cooling flow field leakage rate of the comparative example was 50 c.c/min, and the cooling flow field leakage rate of the fuel cell stack formed by the bipolar plate of the disclosure was 0 c.c/min, and therefore the disclosure clearly has better sealing effect.

Based on the above, in the disclosure, the periphery of the bipolar plate is sealed using a welding method, and therefore the overall structural strength of the fuel cell stack can be increased, the quantity of the sealing members and the total elements can be reduced, and the issues of assembly deformation and slipping and dislocation of the elements can be alleviated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A bipolar plate of a fuel cell, comprising:
   a first flow-field plate, comprising a first gas channel and a first cooling channel; and
   a second flow-field plate stacked with the first flow-field plate, wherein the second flow-field plate comprises a second gas channel and a second cooling channel, and edges of the first flow-field plate and second flow-field plates have a continuous welding portion to seal a periphery of the bipolar plate by a welding method,
   wherein a cooling flow field and a continuous sealed channel are constituted by disposing the first cooling channel of the first flow-field plate opposite to the second cooling channel of the second flow-field plate, the continuous sealed channel is located between the cooling flow field and the continuous welding portion, and a height of the continuous sealed channel and a height of the cooling flow field are the same.

2. The bipolar plate of a fuel cell of claim 1, wherein the first gas channel and the second gas channel comprise a column channel, a serpentine channel, or an interdigitated channel.

3. The bipolar plate of a fuel cell of claim 1, wherein the first gas channel and the first cooling channel are concave-convex grooves with complementary shapes.

4. The bipolar plate of a fuel cell of claim 1, wherein the second gas channel and the second cooling channel are concave-convex grooves with complementary shapes.

5. The bipolar plate of a fuel cell of claim 1, wherein a cooling fluid is contained in the cooling flow field.

6. The bipolar plate of a fuel cell of claim 1, further comprising a continuous welding ring disposed at the continuous welding portion between the first flow-field plate and the second flow-field plate, wherein the continuous welding portion is joined by melting the continuous welding ring.

7. The bipolar plate of a fuel cell of claim 1, wherein the welding method is plasma arc welding or laser welding.

8. The bipolar plate of a fuel cell of claim 1, wherein the first flow-field plate and the second flow-field plate are metal materials.

9. The bipolar plate of a fuel cell of claim 1, further comprising first and second gas inlet holes and first and second gas discharge holes respectively disposed at opposite sides of the bipolar plate.

10. The bipolar plate of a fuel cell of claim 9, further comprising a cooling liquid inlet hole and a cooling liquid discharge hole respectively disposed at opposite sides of the bipolar plate, and the cooling liquid inlet hole and the cooling liquid discharge hole are connected to the first cooling channel and the second cooling channel.

11. A fuel cell, comprising:
    a membrane electrode assembly (MEA);
    a pair of bipolar plates, wherein the MEA is disposed between the pair of bipolar plates, and each of the bipolar plates is the bipolar plate of claim 1; and
    a plurality of gas sealing members respectively disposed between the MEA and each of the bipolar plates.

12. A fuel cell stack, comprising a plurality of fuel cells, wherein each of the fuel cells is the fuel cell of claim 11, and the fuel cells are stacked.

* * * * *